United States Patent
McKee et al.

[11] Patent Number: 5,842,041
[45] Date of Patent: Nov. 24, 1998

[54] COMPUTER SYSTEM EMPLOYING A CONTROL SIGNAL INDICATIVE OF WHETHER ADDRESS IS WITHIN ADDRESS SPACE OF DEVICES ON PROCESSOR LOCAL BUS

[75] Inventors: Gerard T. McKee; Victor F. Andrade; Kelly McCord Horton, all of Austin, Tex.

[73] Assignee: Advanced Micro Devices, Inc., Sunnyvale, Calif.

[21] Appl. No.: 246,673

[22] Filed: May 20, 1994

[51] Int. Cl.⁶ ............. G06F 13/00; G06F 13/14
[52] U.S. Cl. .............. 395/843; 395/823; 395/858
[58] Field of Search ............. 395/200.05, 823, 395/858, 843, 821, 842

[56] References Cited

U.S. PATENT DOCUMENTS

| | | | |
|---|---|---|---|
| 4,293,909 | 10/1981 | Catiller et al. | 364/200 |
| 4,466,098 | 8/1984 | Southard | 371/9 |
| 4,980,850 | 12/1990 | Morgan | 364/900 |
| 5,125,084 | 6/1992 | Begun et al. | 395/375 |
| 5,179,689 | 1/1993 | Leach et al. | 395/425 |
| 5,309,568 | 5/1994 | Ghosh et al. | 395/325 |
| 5,561,818 | 10/1996 | Kawasaki | 395/843 |

FOREIGN PATENT DOCUMENTS

A-0 377 971  12/1989  European Pat. Off. .

*Primary Examiner*—Thomas C. Lee
*Assistant Examiner*—Rehana Perveen
*Attorney, Agent, or Firm*—Conley, Rose & Tayon; B. Noel Kivlin

[57] ABSTRACT

An integrated processor is provided that employs an improved address decoding method during bus cycles of an external master. An external PCI master may initiate a cycle (either memory or I/O) on the PCI bus by asserting an address signal on the PCI bus along with the FRAME signal which indicates the start of the PCI cycle. After the address becomes stable, the bus interface unit transfers the address signal to the CPU local bus. The bus interface unit does not assert or drive the address strobe signal ADS at this time, however, and thus a CPU local bus cycle is not initiated. The decode logic within the memory or I/O control unit responsively decodes the address signal to determine whether the address is mapped within the address space of the respective control unit. If the address is not within the mapped space of the respective control unit, the control unit does not assert the hit signal, and thus the bus interface unit does not initiate a corresponding CPU local bus cycle and does not drive the PCI device select signal DEVSEL. The PCI bus cycle may then proceed normally in that either another PCI slave may assert the device select DEVSEL signal to indicate that it is responding to the cycle, or the cycle will be aborted by the PCI master. If the address is determined to be within the mapped space of the respective control unit, the control unit asserts the hit signal to inform the bus interface unit that the address is mapped to a device situated on the CPU local bus. The bus interface unit accordingly asserts the device select signal DEVSEL to claim the current cycle, and initiates a corresponding cycle, memory or I/O cycle, or the CPU local bus.

26 Claims, 5 Drawing Sheets

COMPUTER SYSTEM EMPLOYING A CONTROL SIGNAL INDICATIVE OF WHETHER ADDRESS IS WITHIN ADDRESS SPACE OF DEVICES ON PROCESSOR LOCAL BUS

BACKGROUND OF THE INVENTION

1. Field of the Invention

This invention relates to address decoding within computer systems and more particularly to a method and apparatus for consolidating an address decode in one location to reduce the required circuitry for address decoding and to hence reduce the amount of required on-chip space.

2. Description of the Relevant Art

Computer system designs continue to emphasize increased performance along with a reduction in the size of components. By reducing the size of various computer system components and integrating various logical elements into a single chip, there is less distance between the components, thus allowing reduced propagation delays and better system performance. In current microprocessor based architectures, a fast and efficient decode of the memory and input/output (I/O) space has become increasingly important in improving system performance.

For IBM compatible computers (i.e. computers which utilize the industry standard PC architecture), the system memory space and I/O space may be distributed across several physical devices. IBM compatible computers have undergone a complex evolutionary path with respect to the mapping of memory and I/O space in order to maintain backwards compatibility with existing hardware and software. As a result of this complex evolutionary path, IBM compatible computers require the decoding of numerous noncontiguous addresses which are distributed throughout the memory and I/O space. A further complication is that address mapping to physical devices is typically not set during product development, but rather the address mapping depends upon the end user's hardware configuration, which changes as devices are added or removed. Therefore, in IBM compatible computers, the memory and I/O space decode logic requires numerous software programmable configuration registers and involves the decode of dozens of noncontiguous address regions. This requires a large amount of circuitry and thus consumes a large area on the chip dye.

A recent development in computer system architectures has been the adoption of various local bus standards including the Peripheral Component Interconnect (PCI) bus. Employment of a PCI bus within an IBM compatible computer requires a logic unit referred to as a PCI bridge which connects the CPU local bus to the PCI bus. The PCI bridge orchestrates the transfer of various bus cycles from the CPU local bus to the PCI bus, and vice versa. Computer systems typically also include a memory control unit connected to the microprocessor via the CPU local bus. The memory control unit provides an interface to a system memory space. Both the memory control unit and the PCI bridge include address decode logic to determine whether the address of a given cycle corresponds to a location in the memory space situated on the CPU bus, or to a device situated on the PCI bus. However, due to the large amount of die space required for this address decode logic, a method and apparatus are desirable which reduces the amount of address decode logic incorporated within a computer system. Reducing the amount of address decode logic produces a corresponding reduction in die size, and thus higher manufacturing yields and lower cost. Reducing the amount of address decode logic further allows other components to be integrated on a single chip or die, thus increasing system performance.

SUMMARY OF THE INVENTION

The problems outlined above are in large part solved by a method and apparatus for improved address decoding for a bus interface unit according to the present invention. In one embodiment, a processor is connected to a bus interface unit through a CPU local bus. A memory control unit and an input/output (I/O) control unit are also connected to the CPU local bus. The memory control unit and I/O control unit interface to a memory space and an I/O space, respectively. The bus interface unit provides an interface to an external bus, such as a PCI bus. The processor, memory control unit, I/O control unit, and bus interface unit may be fabricated on a common semiconductor die to form an integrated processor. When the processor initiates a given local bus cycle (i.e., either memory or I/O), the microprocessor asserts an address on the address bus and also asserts an address strobe signal ADS to signal the start of a local bus cycle. After the address becomes stable, decode logic within the memory control unit and the I/O control unit determines whether the address is directed to the memory or I/O address space, respectively. If so, the respective control unit asserts a hit signal to inform the bus interface unit that the current cycle is destined for a device residing on the CPU local bus, and thus that the bus interface unit should not begin an external PCI bus cycle. If, on the other hand, the address is determined not to be directed to the memory or I/O address space (i.e. if the address corresponds to a slave device on the PCI bus), the respective control unit does not assert the hit signal. Thus, since the hit signal is not asserted, the bus interface unit initiates a corresponding cycle on the external PCI bus to access the PCI slave device.

An external PCI master may initiate a cycle (either memory or I/O) on the PCI bus by asserting an address signal on the PCI bus along with the FRAME signal which indicates the start of the PCI cycle. After the address becomes stable, the bus interface unit transfers the address signal to the CPU local bus. The bus interface unit does not assert or drive the address strobe signal ADS at this time, however, and thus a CPU local bus cycle is not initiated. The decode logic within the memory or I/O control unit responsively decodes the address signal to determine whether the address is mapped within the address space of the respective control unit. If the address is not within the mapped space of the respective control unit, the control unit does not assert the hit signal, and thus the bus interface unit does not initiate a corresponding CPU local bus cycle and does not drive the PCI device select signal DEVSEL. The PCI bus cycle may then proceed normally in that either another PCI slave may assert the device select DEVSEL signal to indicate that it is responding to the cycle, or the cycle will be aborted by the PCI master. If the address is determined to be within the mapped space of the respective control unit, the control unit asserts the hit signal to inform the bus interface unit that the address is mapped to a device situated on the CPU local bus. The bus interface unit accordingly asserts the device select signal DEVSEL to claim the current cycle, and initiates a corresponding cycle, memory or I/O cycle, or the CPU local bus. As a result of the improved address decoding method and apparatus, address decoding logic within the bus interface unit may be eliminated, thereby reducing the required die size and thus accommodating higher manufacturing yields and lower costs.

Broadly speaking, the present invention contemplates a computer system which comprises a system memory, a memory control unit coupled to the system memory, a bus interface unit coupled to the memory control unit via a local bus, and a peripheral device coupled to the bus interface unit via a secondary bus. The peripheral device is capable of executing a memory cycle on the secondary bus and the bus interface unit is capable of providing an address signal from the secondary bus to the local bus when the memory cycle is executed by the peripheral device. The memory control unit is capable of decoding the address signal and providing a control signal to the bus interface unit indicative of whether the address signal corresponds to an address location within the system memory. The bus interface unit is responsively capable of initiating a corresponding cycle on the local bus which corresponds to the memory cycle on the secondary bus if the control signal indicates that the address signal corresponds to the address location within the system memory.

The invention further contemplates a computer system comprising an I/O control unit for controlling the transfer of data to an I/O space, a bus interface unit coupled to the I/O control unit via a local bus, and a peripheral device coupled to the bus interface unit via a secondary bus. The peripheral device is capable of executing an I/O cycle on the secondary bus and the bus interface unit is capable of providing an address signal from the secondary bus to the local bus when the I/O cycle is executed by the peripheral device. The I/O control unit is capable of decoding the address signal and providing a control signal to the bus interface unit indicative of whether the address signal corresponds to an address location within the I/O space. The bus interface unit is responsively capable of initiating a corresponding cycle on the local bus which corresponds to the I/O cycle on the secondary bus if the control signal indicates that the address signal corresponds to the address location within the I/O space.

The invention still further contemplates a method for operating a bus interface unit which provides an interface between a local bus and a secondary bus, wherein a memory control unit is coupled to the local bus and a peripheral device is coupled to the secondary bus. The method comprises the steps of initiating a memory cycle on the secondary bus, providing an address signal associated with the memory cycle through the bus interface unit to the local bus, decoding the address signal on the local bus, and asserting a control signal if the address signal corresponds to an address location within a system memory coupled to the memory control unit. The method comprises the further step of invoking the bus interface unit to initiate a corresponding memory cycle on the local bus if the control signal is asserted.

The invention finally comprises a method for operating a bus interface unit which provides an interface between a local bus and a secondary bus, wherein a I/O control unit is coupled to the local bus and a peripheral device is coupled to the secondary bus. The method comprises the steps of initiating an I/O cycle on the secondary bus, providing an address signal associated with the I/O cycle through the bus interface unit to the local bus, decoding the address signal on the local bus, and asserting a control signal if the address signal corresponds to an address location within an I/O space associated with the I/O control unit. The method comprises the further step of invoking the bus interface unit to initiate a corresponding I/O cycle on the local bus if the control signal is asserted.

BRIEF DESCRIPTION OF THE DRAWINGS

Other objects and advantages of the invention will become apparent upon reading the following detailed description and upon reference to the accompanying drawings in which.

Figure 1:
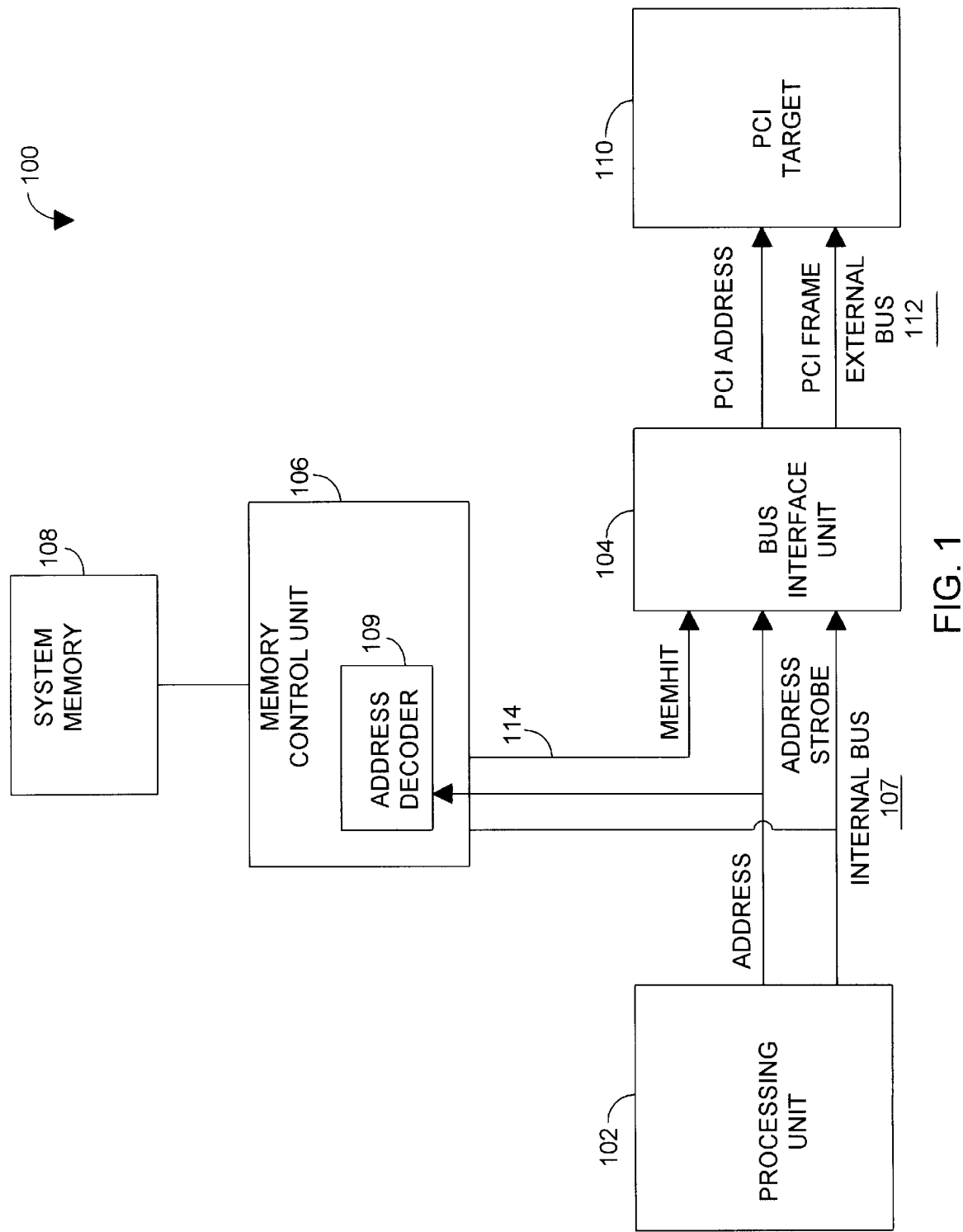
FIG. 1 is a block diagram of a portion of a computer system that implements an address decoding scheme during memory cycles to a PCI target.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring next to the drawings, FIG. 1 is a block diagram of a portion of a computer system 100 including a processing unit 102 coupled to a bus interface unit 104 and a memory control unit 106 via an internal bus 107. A system memory 108 is also shown coupled to memory control unit 106. A PCI target (slave) device 110 is coupled to a second port of bus interface unit 104 via an external bus 112.

Processing unit 102 is a data processing unit that implements a predetermined instruction set. Processing unit 102 is illustrative of, for example, a model 80486 microprocessor.

Memory control unit 106 is responsive to memory cycles initiated on internal bus 107 and orchestrates the transfer of data between the internal bus 107 and system memory 108. Accordingly, memory control unit 106 includes an internal address decoder 109 to determine whether a particular memory cycle executed on external bus 110 corresponds to a memory location of system memory 108. This internal address decoding circuitry may be programmable according to conventional techniques and configurations.

In its illustrated form, external bus 112 is a PCI (Peripheral Component Interconnect) bus. It is understood, however, that other peripheral bus standards, such as the ISA (Industry Standard Architecture) and EISA (Extended Industry Standard Architecture) buses could be alternatively employed. In addition, internal bus 107 is a model 80486-style CPU local bus, although other local bus standards could be alternatively employed depending upon the system.

During operation of computer system 100, if processing unit 102 executes a memory cycle, the processing unit 102 drives the address lines of internal bus 107 with a valid address signal and asserts the address strobe signal ADS. The bus interface unit 104 and the memory control unit 106 responsively latch the valid address signal. The address decoder 109 within memory control unit 106 then decodes the address signal to determine whether the cycle is directed to a memory location within system memory 108. It will be appreciated by those skilled in the art that the memory cycle may be either a read cycle or a write cycle.

If the address signal corresponds to a location within system memory 108, memory control unit 106 asserts a control signal labeled MEMHIT which is received by bus interface unit 104 via a line 114. Bus interface unit 104 samples line 114 after the assertion of the address strobe signal. In response to detection of the asserted MEMHIT signal, the bus interface unit 104 is prevented from generating a corresponding PCI bus cycle on external bus 112. The memory cycle is instead serviced by memory control unit 106 via internal bus 107.

If, on the other hand, the memory address does not correspond to a location within system memory 108, the memory control unit 106 deasserts the MEMHIT signal. Thus, when the bus interface unit samples line 114 after the address strobe signal is asserted and detects that the MEMHIT signal is deasserted, the bus interface unit 104 initiates a corresponding memory cycle on external bus 112. For a PCI-style bus, the start of a cycle on external bus 112 is marked by the assertion of the PCI frame signal, while simultaneously driving the PCI address signal with the valid address. The handshaking and transfer of data between internal bus 107 and external bus 112 thereafter proceed in a conventional manner.

Figure 2:
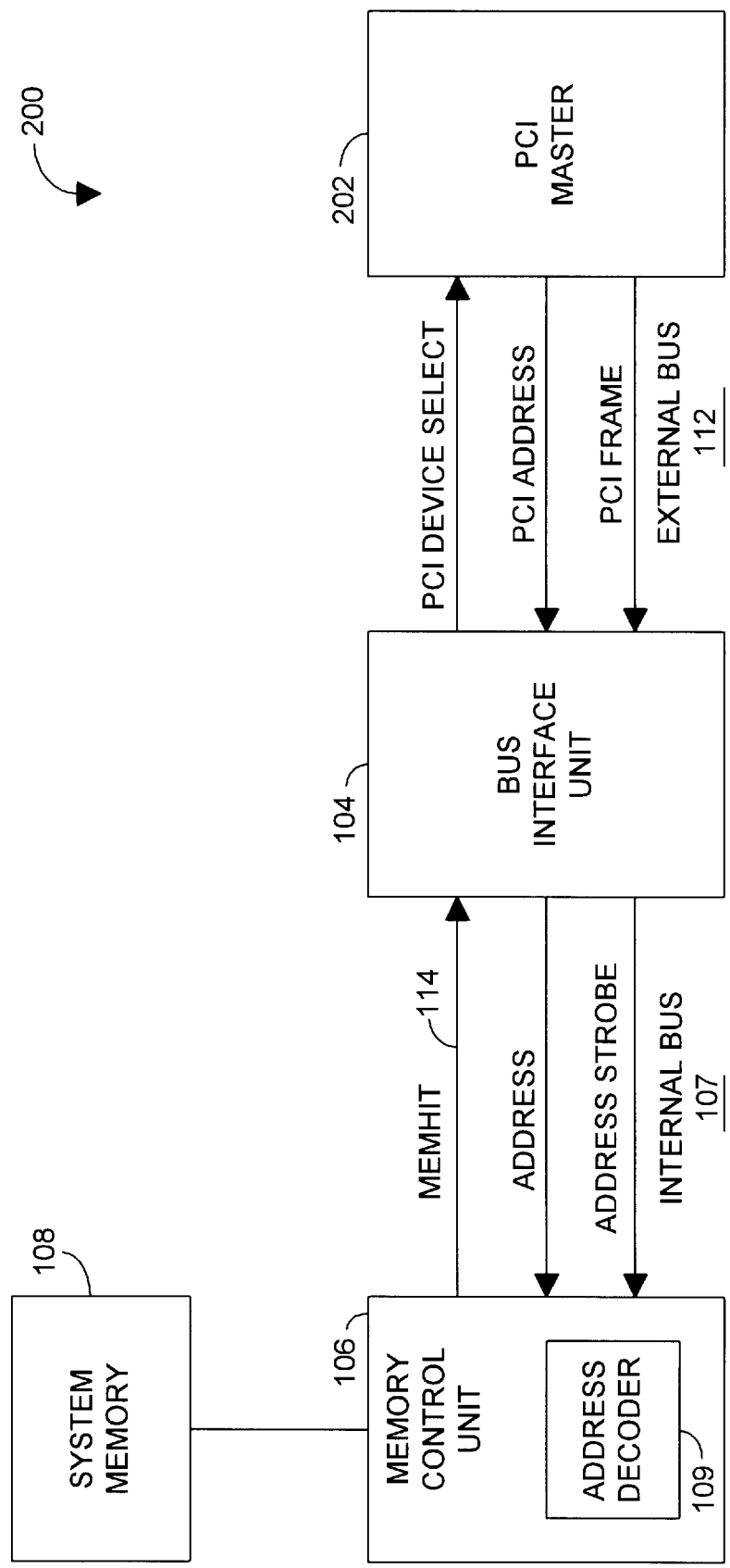
FIG. 2 is a block diagram of a portion of a computer system that implements an address decoding scheme during memory cycles of a PCI master.

Referring next to FIG. 2, a block diagram is shown of a portion of a computer system 200 that illustrates an address decoding scheme when a PCI master device 202 initiates a memory cycle. Circuit portions that correspond to those of FIG. 1 are numbered identically for simplicity and clarity.

When PCI master 202 initiates a memory cycle, the external bus 112 is driven with a valid address and the PCI frame signal is asserted. Bus interface unit 104 responsively drives the corresponding address lines of internal bus 107 with the valid address signal. Bus interface unit 104 does not, however, assert the address strobe signal at this time. In response to the valid address signal, the address decoder 109 of memory control unit 106 determines whether the address signal corresponds to an address location within system memory 108. If the address is not contained by system memory 108, the memory control unit 106 does not assert the MEMHIT signal at line 114. As a result, the bus interface unit 104 does not assert the device select signal DEVSEL, and the PCI bus cycle proceeds normally. That is, either another PCI slave may assert the DEVSEL signal or the cycle will be aborted by the PCI master 202.

If the address is contained by system memory 108, the memory control unit 106 asserts the MEMHIT signal to inform the bus interface unit 104 that the address is mapped within system memory 108. In response, the bus interface unit 104 asserts the PCI DEVSEL signal to claim the current cycle, and the bus interface unit 104 initiates a corresponding memory cycle on internal bus 110 by asserting the address strobe signal. Thereafter, both the internal bus cycle and the PCI bus cycle proceed in a conventional manner.

It is noted that the bus interface unit 104 of FIGS. 1 and 2 may also support burst-cycle data transfers. The bus interface unit 104 may be configured to sample the MEMHIT line only once during a given burst-cycle to determine whether the cycle corresponds to an address of system memory 108. If the burst-cycle crosses a page boundary (i.e., in one embodiment, page boundaries of system memory 108 occur at 16 k intervals), however, the bus interface unit 104 may be required to resample the MEMHIT signal. Furthermore, if the MEMHIT signal is initially asserted during a given burst-cycle executed by PCI master 202 and, if upon crossing a page boundary of system memory 108 the MEMHIT signal becomes deasserted, the bus interface unit 104 may be required to assert a PCI Retry signal on external bus 112. In response to the Retry signal, the PCI master 202 will reinitiate the burst-cycle at the point at which it was effectively halted, and the bus interface unit 104 will no longer transfer the cycle onto internal bus 107 (i.e., since the MEMHIT signal is no longer asserted).

Figure 3:
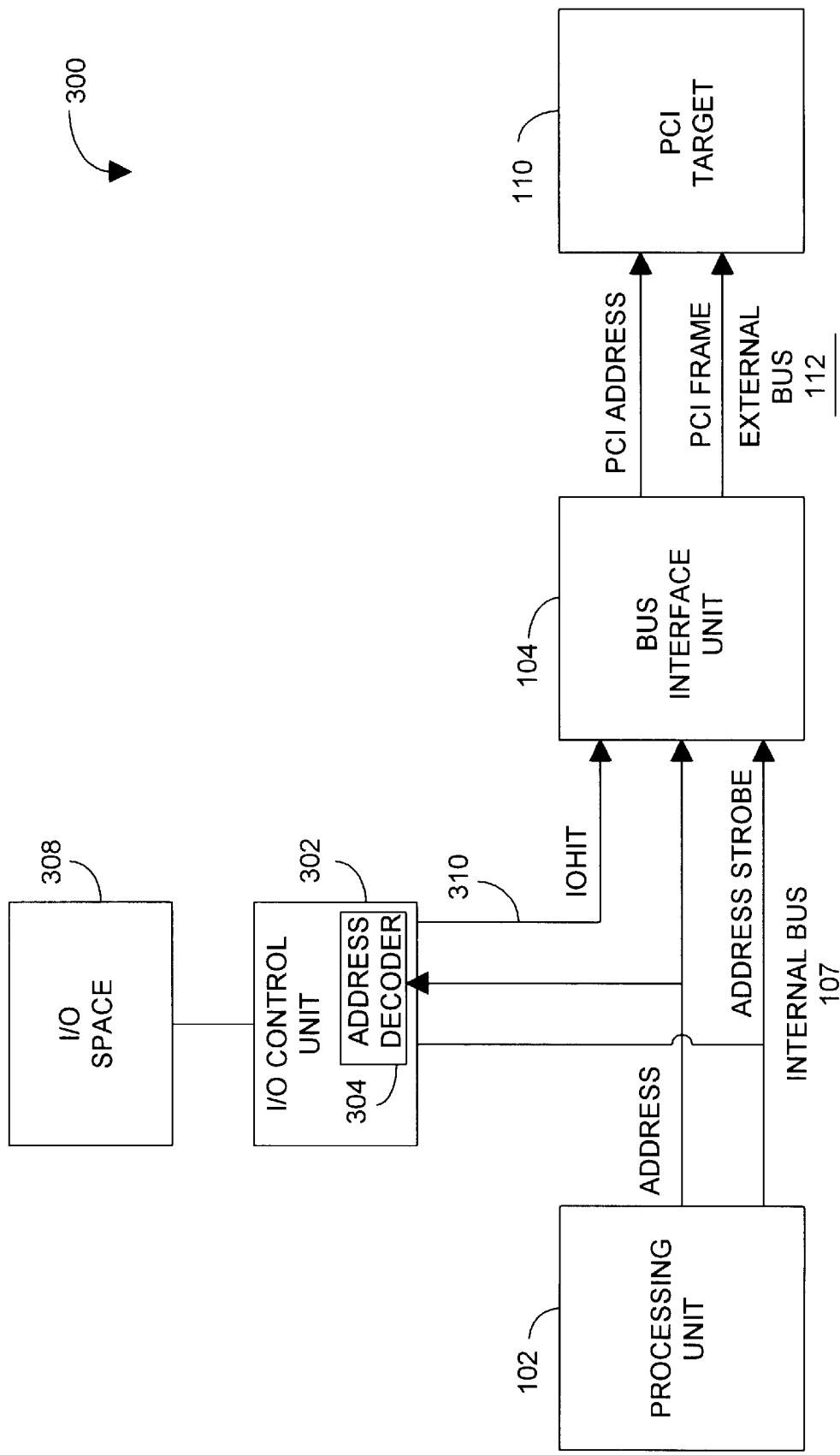
FIG. 3 is a block diagram of a portion of a computer system that implements an address decoding scheme during I/O cycles to a PCI target.
Figure 4:
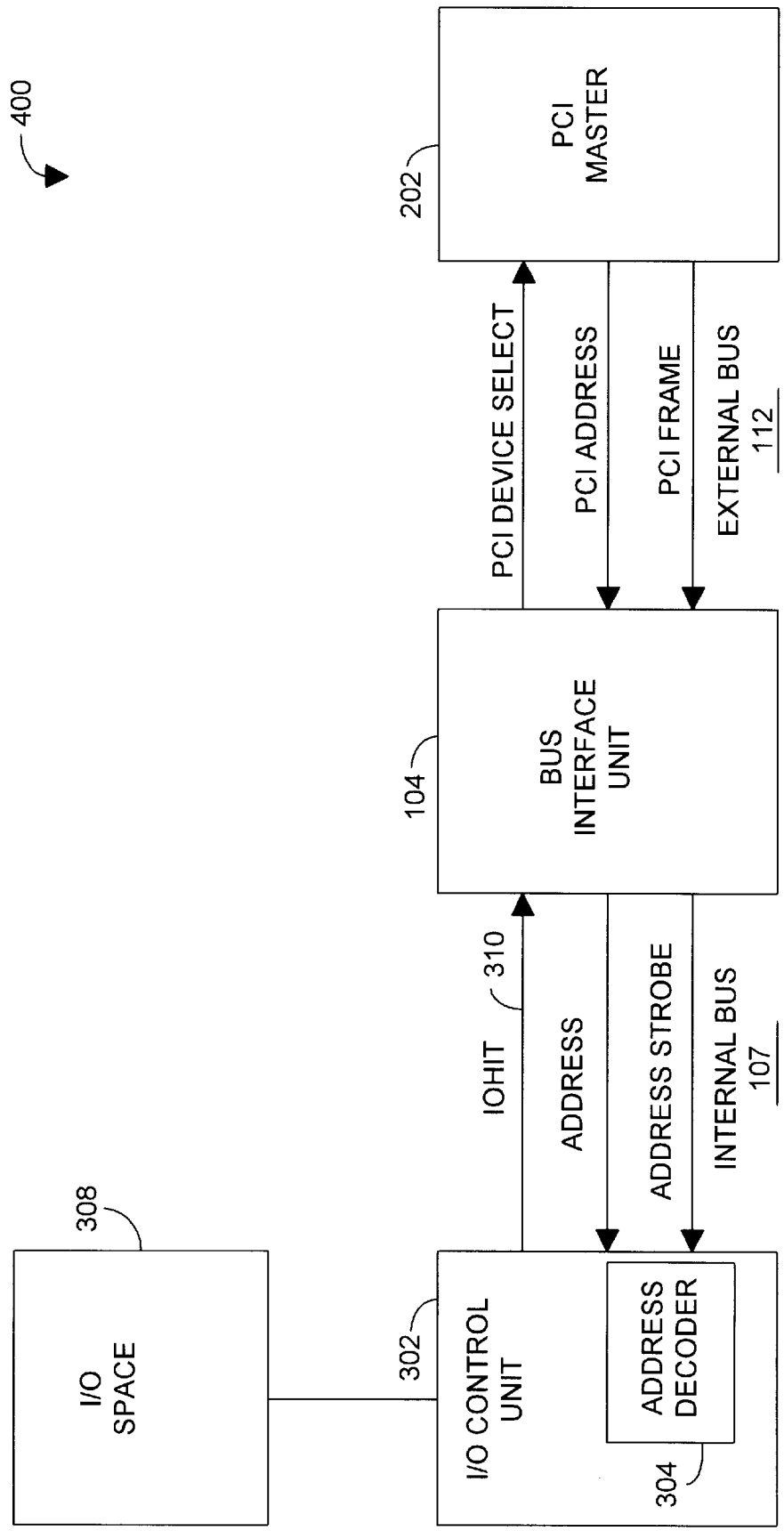
FIG. 4 is a block diagram of a portion of a computer system that implements an address decoding scheme during I/O cycles of a PCI master.

Address decoding schemes similar to those described above with reference to FIGS. 1 and 2 may be employed during I/O cycles to a PCI target and during I/O cycles of a PCI master. Portions of a computer system that implements such address decoding schemes are illustrated in FIGS. 3 and 4. Circuit portions that correspond to those of FIGS. 1 and 2 are numbered identically for simplicity.

Referring to FIG. 3, a portion of a computer system 300 is illustrated that includes an I/O control unit 302 coupled to internal bus 107. During operation of computer system 300, if processing unit 102 executes an I/O cycle, the processing unit 102 drives the address lines of internal bus 107 with a valid address signal and asserts the address strobe signal ADS. The bus interface unit 104 and the I/O control unit 302 responsively latch the valid address signal. An address decoder 304 within I/O control unit 302 then decodes the address signal to determine whether the cycle is directed to an I/O location within a corresponding I/O space 308. It will be appreciated by those skilled in the art that the I/O cycle may be either a read cycle or a write cycle.

If the address signal corresponds to a location within I/O space 308, I/O control unit 302 asserts a control signal labeled IOHIT which is received by bus interface unit 104 via a line 310. Bus interface unit 104 samples line 310 one clock edge after the assertion of the address strobe signal. In response to detection of the asserted IOHIT signal, the bus interface unit 104 is prevented from generating a corresponding PCI bus cycle on external bus 112. The I/O cycle is instead serviced by I/O control unit 302 via internal bus 107.

If, on the other hand, the I/O address does not correspond to a location within I/O space 308, the I/O control unit 302 deasserts the IOHIT signal. Thus, when the bus interface unit samples line 310 one clock edge after the address strobe signal is asserted and detects that the IOHIT signal is deasserted, the bus interface unit 104 initiates a corresponding I/O cycle on external bus 112. The start of the cycle on external bus 112 is marked by the assertion of the PCI frame signal, while simultaneously driving the PCI address signal with the valid address. The handshaking and transfer of data between internal bus 107 and external bus 112 thereafter proceed in a conventional manner.

Referring next to FIG. 4, a block diagram is shown of a portion of a computer system 400 that illustrates an address decoding scheme when a PCI master device 202 initiates an I/O cycle. When PCI master 202 initiates an I/O cycle, the external bus 112 is driven with a valid address and the PCI frame signal is asserted. Bus interface unit 104 responsively drives the corresponding address lines of internal bus 107 with the valid address signal. Bus interface unit 104 does not, however, assert the address strobe signal at this time. In response to the valid address signal, the address decoder 304 of I/O control unit 302 determines whether the address signal corresponds to an address location within I/O space 108. If the address is not contained by I/O space 308, the I/O control unit 302 does not assert the IOHIT signal at line 310. As a result, the bus interface unit 104 does not assert the device select signal DEVSEL, and the PCI bus cycle proceeds normally. That is, either another PCI slave may assert the DEVSEL signal or the cycle will be aborted by the PCI master 202.

If the address is contained by I/O space 108, the I/O control unit 302 asserts the IOHIT signal to inform the bus interface unit 104 that the address is mapped within I/O space 108. In response, the bus interface unit 104 asserts the PCI DEVSEL signal to claim the current cycle, and the bus interface unit 104 initiates a corresponding I/O cycle on internal bus 110 by asserting the address strobe signal. Thereafter, both the internal bus cycle and the PCI bus cycle proceed in a conventional manner.

Figure 5:
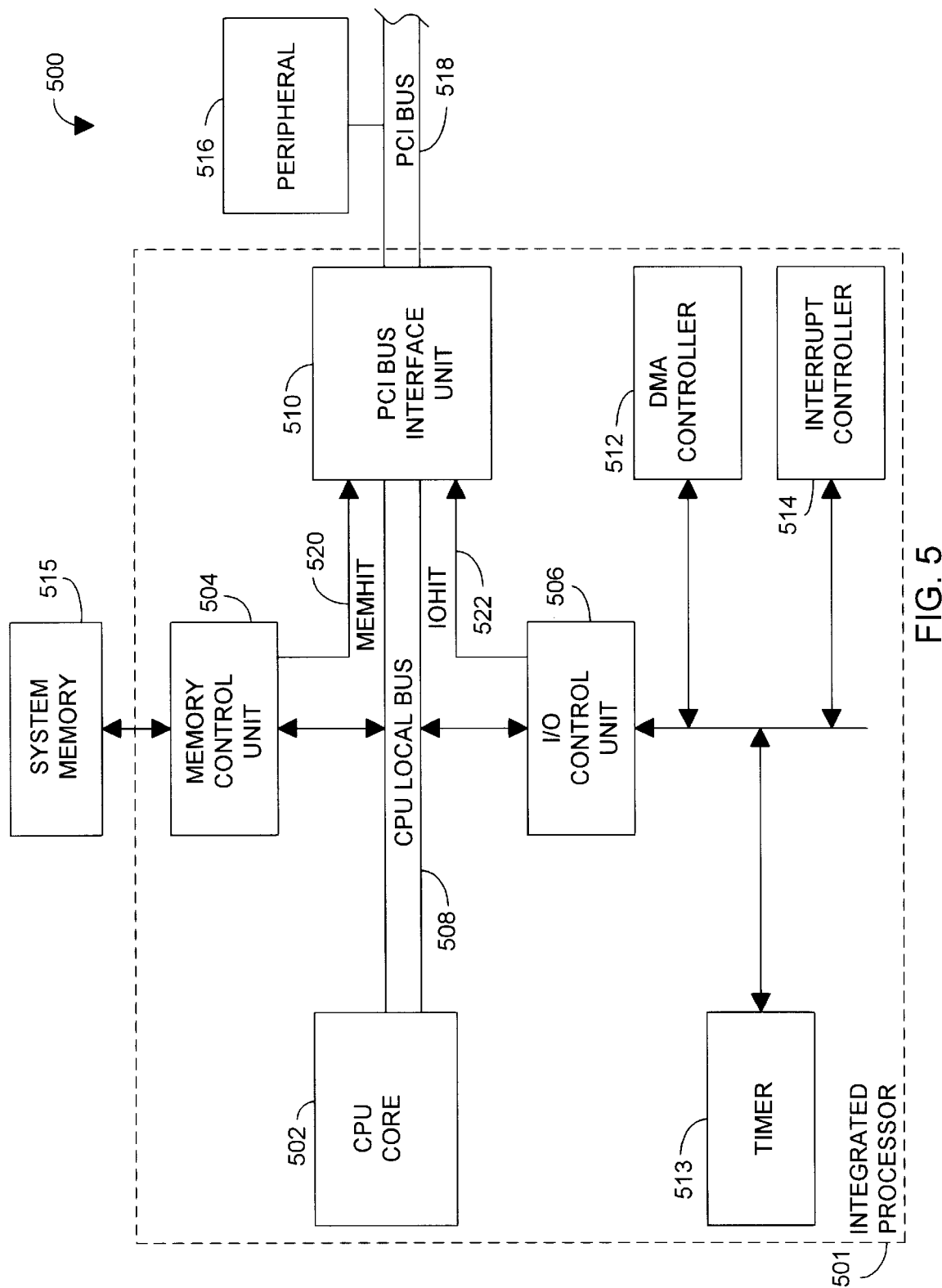
FIG. 5 is a block diagram of an integrated processor that implements an address decoding technique according to the present invention.

Referring next to FIG. 5, a block diagram is shown of a computer system 500 including an integrated processor 501 that employs an improved address decoding scheme for a bus interface unit in accordance with another embodiment of the present invention. The integrated processor 501 includes a CPU core 502 coupled to a memory control unit 504 and an I/O control unit 506 via a CPU local bus 508. A PCI bus interface unit 510 is further coupled to CPU 502 via CPU local bus 508. Integrated processor 501 further includes a DMA controller 512, a timer 513, and an interrupt controller 514 coupled to a second port of I/O control unit 506. An external system memory 515 is coupled to memory control unit 503, and an external peripheral device 516 is coupled to bus interface unit 510 via a PCI bus 518.

CPU core 502 is illustrative of a model 80486-type processor core. It is understood, however, that other CPU cores could be implemented. In addition, although I/O control unit 506 provides an interface between CPU local bus 508 and DMA controller 512, timer 513, and interrupt controller 514, it is noted that other or additional on-chip peripheral devices could be coupled to the second port of I/O control unit 506.

In the embodiment of FIG. 5, peripheral device 516 may operate as either a bus slave device or a bus master device. Exemplary peripheral devices include disk drives and local area network (LAN) devices. It will be appreciated by those skilled in the art that additional peripheral devices (both slave and/or master devices) may be coupled to PCI bus 518.

Memory control unit 504, I/O control unit 506, and bus interface unit 510 are configured to collectively operate according to each of the systems described above with reference to FIGS. 1–4. That is, memory control unit 504 is configured to assert a MEMHIT signal at line 520 if an address during a given memory cycle corresponds to space mapped within system memory 512, and I/O control unit 506 is configured to assert an I IOHIT signal at line 522 if an address during a given I/O cycle corresponds to I/O space mapped within any of the on-chip peripheral devices 512–514. Depending upon possible assertions of the MEMHIT signal or the IOHIT signal, as well as upon the type of cycle initiated (i.e., memory or I/O) and the origin of the cycle (i.e., CPU local bus 508 or PCI bus 518), the bus interface unit 510 selectively transfers the cycle on CPU local bus 508 to PCI bus 518, and vice versa. The initiation of slave cycles on PCI bus 518 by bus interface unit 510 and the response of bus interface unit 510 to master cycles executed on PCI bus 518 are treated in accordance with the corresponding cycles described above with reference to FIGS. 1–4.

In accordance with the integrated processor 501 of FIG. 5, the bus interface unit 510 may be implemented without address decoding logic. As a result, the overall die size required for the bus interface unit may be reduced, thus accommodating higher manufacturing yields and lower costs.

Numerous variations and modifications will become apparent to those skilled in the art once the above disclosure is fully appreciated. It is intended that the following claims be interpreted to embrace all such variations and modifications.

What is claimed is:

1. A computer system comprising:
   a system memory;
   a memory control unit coupled to said system memory;
   a bus interface unit coupled to said memory control unit via a local bus; and
   a peripheral device coupled to said bus interface unit via a secondary bus, wherein said peripheral device is configured to execute a write cycle on said secondary bus, wherein said write cycle includes an associated address signal;
   wherein said bus interface unit is configured to provide said associated address signal from said secondary bus to said local bus in response to said write cycle on said secondary bus without initiating a corresponding write cycle upon said local bus; and
   wherein said memory control unit is configured to decode said associated address signal and generate a control signal to said bus interface unit indicative of whether said associated address signal corresponds to an address location within said system memory; and
   wherein said bus interface unit is configured to initiate a cycle on said local bus which corresponds to said write cycle on said secondary bus in response to said control signal indicating that said associated address signal corresponds to said address location within said system memory.

2. The computer system as recited in claim 1 wherein said bus interface unit is configured to assert an address strobe signal on said local bus in response to an assertion of said control signal indicating that said associated address signal corresponds to said address location within said system memory.

3. The computer system as recited in claim 1 wherein said secondary bus is a PCI standard configuration bus.

4. The computer system as recited in claim 1 wherein said memory control unit includes an address decoder coupled to said local bus for decoding said associated address signal.

5. The computer system as recited in claim 1 wherein said bus interface unit inhibits an initiation of said cycle on said local bus if said control signal indicates that said associated address signal does not correspond to said address location within said system memory.

6. The computer system as recited in claim 1 further comprising a processing unit coupled to said local bus, wherein said processing unit, said bus interface unit, and said memory control unit are fabricated on a common integrated circuit.

7. A computer system comprising:
   an I/O control unit for controlling the transfer of data to an I/O space;
   a bus interface unit coupled to said I/O control unit via a local bus; and
   a peripheral device coupled to said bus interface unit via a secondary bus, wherein said peripheral device is configured to execute an I/O cycle on said secondary bus, wherein said I/O cycle includes an associated address signal;
   wherein said bus interface unit is configured to provide said associated address signal from said secondary bus to said local bus in response to said I/O cycle being executed on said secondary bus by said peripheral device without initiating a corresponding I/O cycle upon said local bus; and
   wherein said I/O control unit is configured to decode said associated address signal and generate a control signal to said bus interface unit indicative of whether said associated address signal corresponds to an address location within said I/O space; and wherein said bus interface unit is configured to initiate a cycle on said local bus which corresponds to said I/O cycle on said secondary bus in response to said control signal indicating that said associated address signal corresponds to said address location within said I/O space.

8. The computer system as recited in claim 7 wherein said bus interface unit is configured to assert an address strobe signal on said local bus in response to an assertion of said control signal indicating that said associated address signal corresponds to said address location within said I/O space.

9. The computer system as recited in claim 7 wherein said secondary bus is a PCI standard configuration bus.

10. The computer system as recited in claim 7 wherein said I/O control unit includes an address decoder coupled to said local bus for decoding said associated address signal.

11. The computer system as recited in claim 7 wherein said bus interface unit inhibits an initiation of said cycle on said local bus if said control signal indicates that said associated address signal does not correspond to said address location with said I/O space.

12. The computer system as recited in claim 7 further comprising a processing unit coupled to said local bus, wherein said processing unit, said bus interface unit, and said I/O control unit are fabricated on a common integrated circuit.

13. The computer system as recited in claim 7 wherein said I/O space is incorporated within a DMA controller.

14. The computer system as recited in claim 7 wherein said I/O space is incorporated within an interrupt controller.

15. A method for operating a bus interface unit which provides an interface between a local bus and a secondary bus, wherein a memory control unit is coupled to said local bus and a peripheral device is coupled to said secondary bus, the method comprising the steps of:

initiating a memory cycle on said secondary bus, wherein said memory cycle includes an associated address signal;

providing said associated address signal through said bus interface unit to said local bus without initiating a corresponding memory cycle on said local bus;

decoding said associated address signal on said local bus;

asserting a control signal in response to said associated address signal corresponding to an address location within a system memory coupled to said memory control unit; and invoking said bus interface unit to initiate said corresponding memory cycle on said local bus in response to said control signal being asserted.

16. The method for operating a bus interface unit as recited in claim 15 comprising the further steps of inhibiting said bus interface unit from initiating said corresponding memory cycle on said local bus if said control signal is not asserted.

17. The method for operating a bus interface unit as recited in claim 15 wherein said step of decoding said associated address signal is performed within said memory control unit.

18. A method for operating a bus interface unit which provides an interface between a local bus and a secondary bus, wherein a I/O control unit is coupled to said local bus and a peripheral device is coupled to said secondary bus, the method comprising the steps of:

initiating an I/O cycle on said secondary bus, wherein said I/O cycle includes an associated address signal;

providing said associated address signal through said bus interface unit to said local bus without initiating a corresponding I/O cycle on said local bus;

decoding said associated address signal on said local bus;

asserting a control signal in response to said associated address signal corresponding to an address location within an I/O space associated with said I/O control unit; and invoking said bus interface unit to initiate said corresponding I/O cycle on said local bus in response to said control signal being asserted.

19. The method for operating a bus interface unit as recited in claim 18 comprising the further steps of inhibiting said bus interface unit from initiating said corresponding I/O cycle on said local bus if said control signal is not asserted.

20. The method for operating a bus interface unit as recited in claim 18 wherein said step of decoding said associated address signal is performed within said I/O control unit.

21. A computer system comprising:

a system memory;

a memory control unit coupled to said system memory;

a bus interface unit coupled to said memory control unit via a local bus; and a peripheral device coupled to said bus interface unit via a secondary bus, wherein said peripheral device is configured to execute a read cycle on said secondary bus, wherein said read cycle includes an associated address signal;

wherein said bus interface unit is configured to provide said associated address signal from said secondary bus to said local bus in response to said read cycle on said secondary bus without initiating a corresponding read cycle upon said local bus; and wherein said memory control unit is configured to decode said associated address signal and generate a control signal to said bus interface unit indicative of whether said associated address signal corresponds to an address location within said system memory; and wherein said bus interface unit is configured to initiate a cycle on said local bus which corresponds to said read cycle on said secondary bus in response to said control signal indicating that said associated address signal corresponds to said address location within said system memory.

22. The computer system as recited in claim 21 wherein said bus interface unit is configured to assert an address strobe signal on said local bus in response to an assertion of said control signal indicating that said associated address signal corresponds to said address location within said system memory.

23. The computer system as recited in claim 21 wherein said secondary bus is a PCI standard configuration bus.

24. The computer system as recited in claim 21 wherein said memory control unit includes an address decoder coupled to said local bus for decoding said associated address signal.

25. The computer system as recited in claim 21 wherein said bus interface unit is configured to inhibit a generation of said cycle on said local bus which corresponds to said read cycle on said secondary bus in response to said control signal indicating that said associated address signal does not correspond to said address location within said system memory.

26. The computer system as recited in claim 21 further comprising a processing unit coupled to said local bus, wherein said processing unit, said bus interface unit, and said memory control unit are fabricated on a common integrated circuit.

* * * * *